(12) United States Patent
Liang et al.

(10) Patent No.: US 9,983,550 B2
(45) Date of Patent: May 29, 2018

(54) OPTICAL ATOMIC CLOCK

(71) Applicant: Oewaves, Inc., Pasadena, CA (US)

(72) Inventors: Wei Liang, Monrovia, CA (US);
Andrey B. Matsko, Pasadena, CA (US); Lute Maleki, Pasadena, CA (US);
Danny Eliyahu, Pasadena, CA (US);
Vladimir S. Ilchenko, Arcadia, CA (US); Anatoliy A. Savchenkov, Glendale, CA (US)

(73) Assignee: OEwaves, Inc., Pasadena, CA (US)

( * ) Notice: Subject to any disclaimer, the term of this patent is extended or adjusted under 35 U.S.C. 154(b) by 157 days.

(21) Appl. No.: 15/127,197

(22) PCT Filed: Mar. 18, 2015

(86) PCT No.: PCT/US2015/021274
§ 371 (c)(1),
(2) Date: Sep. 19, 2016

(87) PCT Pub. No.: WO2015/143048
PCT Pub. Date: Sep. 24, 2015

(65) Prior Publication Data
US 2017/0176949 A1 Jun. 22, 2017

Related U.S. Application Data

(60) Provisional application No. 61/955,701, filed on Mar. 19, 2014.

(51) Int. Cl.
*G01V 3/00* (2006.01)
*G04F 5/14* (2006.01)
*G02F 1/035* (2006.01)

(52) U.S. Cl.
CPC .............. *G04F 5/14* (2013.01); *G02F 1/0356* (2013.01)

(58) Field of Classification Search
USPC ........................................................ 324/304
See application file for complete search history.

(56) References Cited

U.S. PATENT DOCUMENTS

| 7,801,189 B2 | 9/2010 | Maleki et al. |
| 2004/0109217 A1 | 6/2004 | Maleki et al. |
| 2010/0118375 A1 | 5/2010 | Maleki et al. |
| 2010/0329287 A1* | 12/2010 | Lecomte ............... H01S 3/1305 372/3 |

(Continued)

FOREIGN PATENT DOCUMENTS

WO 2014/018944 A2 1/2014

*Primary Examiner* — Rodney Fuller
(74) *Attorney, Agent, or Firm* — Loza & Loza, LLP; Razmig Messerian

(57) ABSTRACT

An optical atomic clock utilizing two different laser light sources is described. A source laser is locked to a first optical resonator, which supports a whispering gallery mode for the source laser and generates optical hyperparametric sidebands from the source laser output by multi-wave mixing. A reference laser is locked to an atomic reference via a second optical resonator, and the first optical resonator is locked to the reference laser. Optical parametric sidebands, which are locked to an atomic reference but are generated from a wavelength unrelated to the clock transition of the atomic reference, are coupled out of the first optical resonator to generate an RF signal useful in atomic timekeeping.

20 Claims, 1 Drawing Sheet

(56) References Cited

U.S. PATENT DOCUMENTS

2013/0003766 A1    1/2013   Savchenkov et al.
2014/0112360 A1*   4/2014   Telle .................... H01S 3/1394
                                                                    372/28

* cited by examiner

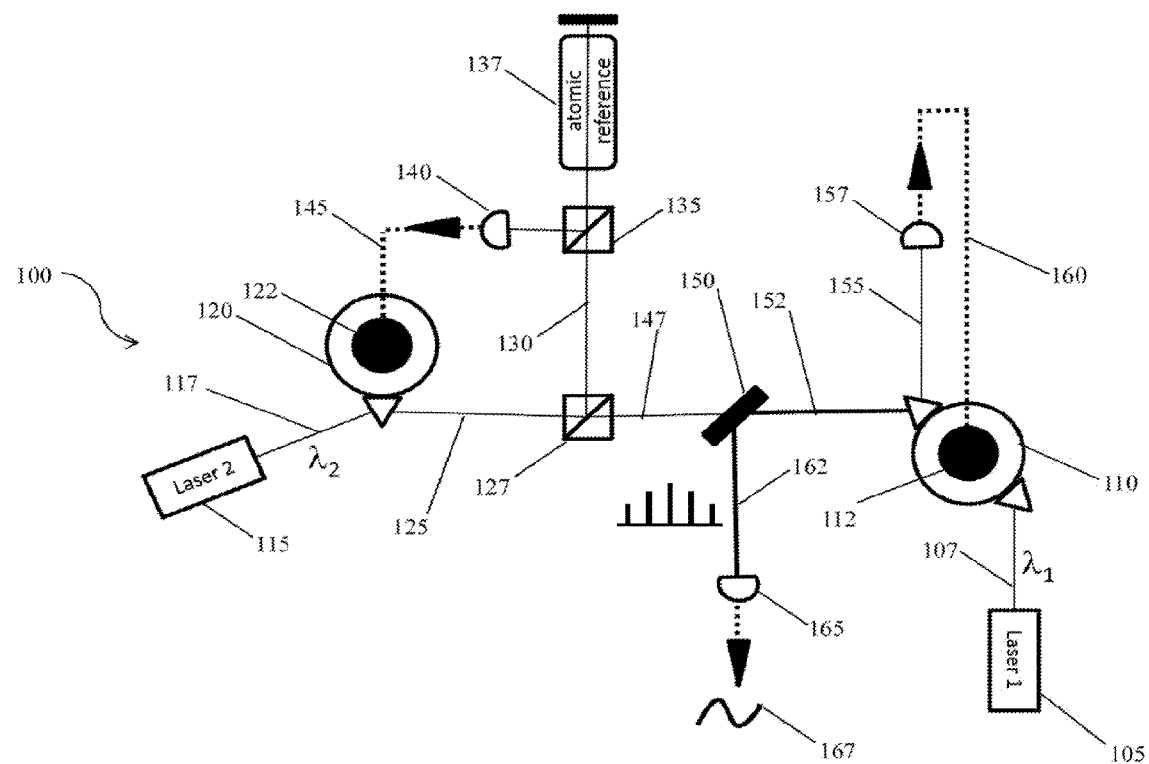

OPTICAL ATOMIC CLOCK

This application claims the benefit of U.S. Provisional Patent Application No. 61/955,701, filed on Mar. 19, 2014. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is atomic clocks, particularly atomic clocks incorporating optical elements.

BACKGROUND

The following description includes information that may be useful in understanding the present invention. It is not an admission that any of the information provided herein is prior art or relevant to the presently claimed invention, or that any publication specifically or implicitly referenced is prior art.

Atomic clocks, which rely on characteristic electronic energy transitions to generate a frequency standard, provide highly accurate measurements of time intervals that are integral to a number of economically important devices and systems, notably global positioning systems. Synchronized networks of such clocks are used to generate the International Atomic Time standard, which serves as the basis of the Coordinated Universal Time used for conventional timekeeping throughout the world.

A typical atomic clock utilizes a controllable electronic oscillator that generates a microwave frequency corresponding to a hyperfine energy transition that is observed in a cesium or rubidium atom. Absorption of the emitted microwave by an atomic reference cell (for example, a vapor cell) containing an appropriate atom or molecule provides feedback for a control loop that adjusts the electronic oscillator to fix the emitted frequency. While relatively simple conceptually, in practice correction for the initial stabilization of the electronic oscillator, frequencies generated by other electronic transitions, and environmental factors such as temperature changes greatly complicates the design and operation of such atomic clocks.

More recently, atomic clocks based on optical frequencies have been developed. For example, U.S. Patent Application Publication No. 2013/0003766 (to Savchenkov et al) describes an optical atomic clock in which laser output is coupled to both a tunable optical resonator and an atomic reference. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. In such an approach, absorption of the laser output by the atomic reference forms part of a feedback loop used to stabilize the tunable optical resonator. The stabilized optical resonator provides, via nonlinear wave mixing of the laser output, an optical comb that is stabilized relative to the atomic reference. This stabilized optical comb is then used to generate an RF signal. In such a design, however, the wavelength used is necessarily limited to one that is compatible with both the optical resonator and the atomic reference.

Thus, there is still a need for an optical atomic clock that decouples optical resonator stabilization from optical comb generation.

SUMMARY OF THE INVENTION

The inventive subject matter provides apparatus, systems and methods in which a tunable optical resonator is used to generate optical parametric sidebands from the output of a first laser by nonlinear wave mixing. A second laser that operates at a different frequency is provided that is locked to an atomic reference. The tunable optical resonator is, in turn, locked to the output of the second laser. In this fashion the optical parametric sidebands generated from the output of a first laser operating at a first wavelength are indirectly locked to a clock transition of an atomic reference via a second laser operating at a second wavelength.

One embodiment of the inventive concept is an optical atomic clock that includes an optical resonator (for example, a whispering gallery mode resonator) made with an optical material that exhibits optical nonlinearity and that can produce two or more optical parametric sidebands from the resulting nonlinear wave mixing. The optical resonator is tunable (for example, by application of heat pressure, and/or electrical potential). A first laser is optically coupled to the optical resonator and is locked to it by a suitable locking mechanism. This first laser operates at a first wavelength that can be used by the optical resonator to produce the optical parametric sidebands. The optical resonator is in turn, locked to a second laser. The second laser is locked to an atomic reference (for example, utilizing a mechanism that includes a Pound-Driver-Hall circuit), and operates at a second wavelength that corresponds to an atomic or molecular clock transition that occurs with a species held within the atomic reference. Suitable atomic references include vapor cells and can, for example, enclose cesium or rubidium as reference species. Other suitable atomic references include a trap (for example, an atom trap, an ion trap, and/or a doped solid state matrix serving as a solid state atom trap), where the trap includes suitable reference atoms or ions. In some embodiments, the second laser is also in optical communication with the optical resonator, which in turn can support two or more resonator modes. The resulting optical parametric sidebands are received by an optical detector, which converts the optical parametric sidebands, which are stabilized by the atomic or molecular clock transition occurring in the atomic reference, into an RF signal. In some embodiments, the first laser generates an output with a shorter wavelength than that of the second laser. In other embodiments, the first laser generates an output with a longer wavelength than that of the second laser.

Another embodiment of the inventive concept is a method of providing an atomic clock. In such an embodiment an optical resonator (for example, a whispering gallery mode resonator) is provided, where the optical resonator is made with an optical material that exhibits optical nonlinearity and can produce two or more optical parametric sidebands from the resulting nonlinear wave mixing. The optical resonator is tunable (for example, by application of heat, pressure, and/or electrical potential). A first laser is also provided that is optically coupled to the optical resonator and is locked to it by a suitable locking mechanism. This first laser operates at a first wavelength that can be used by the optical resonator to produce the optical parametric sidebands. A second laser is also provided, to which the optical resonator is locked. The second laser is, in turn, locked to an atomic reference (for example, utilizing a mechanism that includes a Pound-Driver-Hall circuit), and operates at a second wavelength that corresponds to an atomic or molecular clock transition that occurs with a species held within the atomic reference. Suitable atomic references include vapor cells and can, for example, enclose cesium or rubidium as reference species. Other suitable atomic references include a trap (for example, an atom trap, an ion trap, and/or a doped solid state matrix serving as a solid state atom trap), where the trap includes suitable reference atoms or ions. In some embodiments, the second laser is also in optical communication with the optical resonator, which in turn can support two or more resonator modes. The optical parametric sidebands thus produced are received by an optical detector, which converts the optical parametric sidebands which are stabilized by the atomic or molecular clock transition occurring in the atomic reference, into an RF signal. In some embodiments, the first laser generates an output with a shorter wavelength than that of the second laser. In other embodiments, the first laser generates an output with a longer wavelength than that of the second laser.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1 schematically depicts a device of the inventive concept.

DETAILED DESCRIPTION

The inventive concept provides apparatus, systems and methods in which a tunable optical resonator is used to generate optical parametric sidebands, by nonlinear wave mixing, from a first wavelength output of a first laser. A second laser is also provided that is used to lock the optical resonator. The second laser can operate at a different frequency from that of the first laser, and is locked to an atomic reference that provides an atomic or molecular clock transition corresponding to a frequency of the second laser. As a result the optical parametric sidebands generated from the output of a first laser are indirectly locked to an electronic clock transition of the atomic reference, however the first wavelength produced by the first laser need not correspond to the atomic or molecular clock transition. The optical parametric sidebands thus produced can be utilized to generate an RF signal with a characteristic and highly reproducible frequency that can serve as an atomic clock.

One should appreciate that the decoupling the frequency corresponding to the atomic or molecular clock transition from the frequency used to generate the RF signal characteristic of the atomic clock provides for far greater design flexibility than in the prior art, as it is not necessary to match a mode of the optical resonator with an atomic or molecular clock transition.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

An example of a device of the inventive concept is depicted schematically in FIG. 1. As shown, the device 100 includes a source laser source 105, which provides an output at a first wavelength ($\lambda_1$) along optical path 107. Source laser 105 can be any laser suitable for producing a first wavelength that can serve as the basis of the desired RF frequency, for example a diode laser with a nominal output of 1550 nm. Optical path 107 is directed towards a tunable optical resonator 110, into which at least part of the output of the source laser 105 is coupled. Such a tunable optical resonator 110 can be composed, at least in part, of a material that demonstrates an optical nonlinearity that supports multiple wave mixing. In a preferred embodiment of the inventive concept, the tunable optical resonator 110 is composed of a material (such as $MgF_2$) that provides cubic nonlinearity, and supports four wave mixing. A tunable optical resonator 110 can be composed of a material that changes refractive index in response to environmental factors (such as pressure, temperature, and/or electrical potential), thus permitting tuning of the optical resonator 110. Towards that end, the optical resonator 110 can be coupled (for example thermally coupled, electrically coupled, or physically coupled) to a transducer 112 by which the local environment of the optical resonator 110 can be modified. For example, a transducer 112 can be a resistive element that is thermally coupled to the optical transducer 110 and can provide sufficient heat to be effective in modifying the refractive index of the optical transducer. In another example the transducer 112 can a piezo device that is in contact with the surface of the transducer 110, and can apply sufficient pressure to the transducer 110 to be effective in inducing a change in the refractive index. In still another example, a transducer 112 can be an electrode that is electrically coupled to the transducer 110, and can provide an electrical potential sufficient to induce a change in the refractive index. Such an electrode can be in the form of an electrode contacted to the surface of the optical resonator or, alternatively, can be in the forma of an area of conductive film applied to the optical resonator during the manufacturing process. In some embodiments, more than one transducer can be provided. In such embodiments, the transducer can utilize similar or different modes for altering the refractive index of the optical resonator. In other embodiments, a single, multiple mode transducer is provided that can provide more than one environmental stimulus effective in altering the refractive index of an optical resonator of the inventive concept, either simultaneously or sequentially. For example, such a multi-mode transducer can be configured to provide both heat energy and electrical potential, either sequentially or simultaneously.

In a preferred embodiment of the inventive concept, optical resonator 110 is a whispering gallery mode resonator. Such a whispering gallery mode resonator can have an axial symmetry about which waves in the whispering gallery mode travel. Towards that end the external surface can be curved towards the axis of symmetry. For example, a suitable whispering gallery mode resonator can be in the form of a sphere, ovoid, ring, and/or torus, and can be dimensioned to support one or more whispering gallery modes. In some embodiments a whispering gallery mode resonator can include a protruding region about the axis of symmetry that serves to confine light trapped in a whispering gallery mode of the resonator.

Whispering gallery mode resonators of the inventive concept can be constructed from wry suitable material. Suitable materials include crystalline and non-crystalline substances. Examples of such suitable materials include glass, fused silica, lithium niobate, calcium fluoride ($CaF_2$), and magnesium fluoride ($MgF_2$).

A whispering gallery mode resonator of the inventive concept has a size, configuration, and composition that supports one or more whispering gallery modes at the desired wavelength(s). In an exemplary embodiment, a suitable resonator for use with a source laser with a nominal 1550 nm output can be a 7 mm $MgF_2$ ring resonator. In such an embodiment a counterpropagating $\lambda_1$ wave within optical resonator 110 can be generated, for example by backscatter within the material of the optical resonator. Alternatively, a counterpropagating wave can be generated by deliberately introduced inclusion within or surface features of resonator 110. In preferred embodiments, at least a portion of such a counterpropagating wave is coupled out of resonator 110 and directed back along optical path 107 to lock the source laser 105 to optical resonator 110 (for example, by optical injection).

As shown in FIG. 1, a second or reference laser 115 is provided that generates a laser beam at a second wavelength ($\lambda_2$) along optical path 117. Such a reference laser 115 can be any laser source suitable for producing an output wavelength that is compatible with a desired atomic reference, and in some embodiments is compatible with a whispering gallery mode of resonator 110. In a preferred embodiment the reference laser is a DFB laser, which can, for example, have provide a nominal output of 795 nm (corresponding to a rubidium electronic "clock" transition). At least a portion of the light on optical path 117 is coupled into a second optical tunable optical resonator 120.

In preferred embodiments, optical resonator 120 is a whispering gallery mode resonator, and can have any suitable configuration (for example, spherical, ovoid, ring, or toroidal). For example, when used with an DFB reference laser having a nominal 795 nm output, a suitable optical resonator can be a 2 to 3 mm diameter ring resonator, and can be loaded up to 500 kHz. The tunable optical resonator 120 is coupled to a transducer 122, which functions similarly to transducer 112 (described above) to induce changes in the refractive index of optical resonator 122. In preferred embodiments of the inventive concept, resonator 120 is a whispering gallery mode resonator. At least a portion of the light directed to the optical resonator 120 is coupled out of the optical resonator along optical path 125, along which it is directed to a beam splitter 127, which splits the incoming light into optical paths 130 and 147. Optical path 130 is directed towards a second beam splitter 135, which directs light to and from an atomic reference 137.

A variety of atomic references are available and can serve as an atomic reference of the inventive concept. For example, a suitable atomic reference can be a vapor cell containing atoms or molecules that provide an electronic transition (i.e. a clock transition) that corresponds to the energy provided by $\lambda_2$. Alternatively, the atomic reference can include a atom or molecule trap. Suitable traps include an atom trap, an ion trap, and a solid state atom trap (for example, a doped solid state matrix). Atoms or molecules localized within or by an atomic reference can be of any species that provides an electronic transition of appropriate magnitude and reproducibility to serve as a clock transition, such as cesium, rubidium, ytterbium, and/or hydrogen.

Selective absorption of light received from the beam splitter 135 produces a returning beam that is directed by beam splitter 135 to a photodetector 140. Output from photodetector 140 is in turn used to provide a control signal 145 to transducer 122 that locks optical transducer 120 to the atomic reference 137. Light coupled out of transducer 122 and back along optical path 117 then serves to lock the output of the reference laser 115 to the atomic reference 137. In preferred embodiments of the inventive concept the control signal 145 is generated using a device that includes a Pound-Driver-Hall circuit.

Light from the reference laser 115 is directed along optical path 147 by beam splitter 127, and passes through a dichroic mirror 150 along optical path 152. At least a portion of the light traveling on optical path 152 is coupled into optical resonator 110. It should be appreciated that, in such embodiments, optical resonator 110 can be a whispering gallery mode resonator that supports at least two resonator modes, corresponding to $\lambda_1$ and $\lambda_2$. At least a portion of the light coupled into resonator 110 is coupled out of the resonator along optical path 155 and into photodetector 157. In some embodiments a device that selectively permits light from the reference laser 115 to travel along optical path 155 is included, for example an optical filter, optical grating, and/or dichroic mirror that selectively permits light from the reference laser 115 to reach the photodetector 157. Output from photodetector 157 is utilized to generate a control signal 160 that is used to control the transducer 112, thereby locking resonator 110 to the reference laser, which in turn is locked to the atomic reference 137. In some embodiments of the inventive concept the control signal 160 is generated using a device that includes a Pound-Driver-Hall circuit. It should be appreciated that this, in turn, can lock the source laser 105 operating at $\lambda_1$ indirectly to an atomic reference 137 having a clock transition that corresponds to a distinct and independent $\lambda_2$. This provides unprecedented flexibility m selection of reference lasers, source lasers, and atomic references in the design and implementation of optical atomic clocks.

The output from the source laser 105 can be controlled to provide sufficient optical power (which can be greater than that of reference laser 115) to generate optical hyperparametric sidebands within optical resonator 110 via multiple wave mixing, which can, for example, generate an optical comb. For example, utilizing a source laser with a nominal 1550 nm output and a rubidium atomic reference-stabilized reference laser with a nominal 795 nm output, a 7 mm $MgF^2$ ring whispering gallery multimode resonator can be TM loaded to about 70 kHz at 795 nm and to about 300 kHz at 1550 nm. Such optical hyperparametric sidebands can be coupled out of optical resonator 110 and directed along optical path 152 to dichroic mirror 150. Dichroic mirror 150 reflects these optical hyperparametric sidebands to a photodetector 165, the output of which can be used to generate an RF signal 167 useful for atomic timekeeping.

Another embodiment of the inventive concept is a method for generating an RF signal useful for atomic timekeeping. In such a method a source laser is provided that is optically coupled to a first tunable optical resonator, which is preferably a whispering gallery mode resonator with multiple resonator modes. Light emitted by the source laser enters the first optical resonator; in some embodiments a counterpropagating wave generated within the first resonator (for example, by backscatter) is coupled out of the resonator and returned to the source laser. Such returning light can serve to couple the source laser to the first optical resonator, for example by optical injection.

A second, or reference, laser is also provided that can provide light at a wavelength that is separate and distinct from that of the source laser. In some methods of the inventive concept, light provided by the reference laser is at a longer wavelength than that of the source laser. In other embodiments the light provided by the reference laser is at a shorter wavelength than that of the source laser. Light from the reference laser is directed towards and coupled into a second optical resonator, which can be a whispering gallery mode resonator. Light can be coupled out of the second optical resonator as a beam that is split, with a portion being directed to an atomic reference. The wavelength emitted by the reference laser is selected to correspond to an electronic transition (i.e. a clock transition) of an atomic or molecular species of the atomic reference. Absorption of at least some of the light from the reference laser and that is directed to the atomic reference is detected by a photodetector which provides a signal used to control the second optical resonator. This can be accomplished by providing a control signal directed to a transducer that is in contact with or otherwise in communication with the second optical resonator. For example, a control signal can be provided that modifies the refractive index of the second optical resonator by heating, application of pressure, application of an electrical potential, or a combination of these. In doing so, the second optical resonator becomes coupled to the atomic reference.

At least some of the light in the second optical resonator can be coupled out of the resonator and returned to the reference laser in order to lock the reference laser to the second optical resonator (for example, by optical injection). In doing so, the reference laser becomes locked to the atomic reference via the locking of the second optical resonator to the optical reference. This results in stabilization of the output of the reference laser, relative to the atomic reference.

As noted above, a portion of the light coupled out of the second optical resonator is directed towards a beam splitter that directs a portion of the light to the atomic reference. Another portion of this light is directed towards a dichroic mirror, through which it passes to be coupled into the first optical resonator. It should be appreciated that it is advantageous for the first optical resonator to support whispering gallery modes for both the source laser output and the reference laser output.

At least a portion of the light from the reference laser is subsequently coupled out of the first optical resonator and is directed towards a second photodetector, the output of which is used to generate a second control signal that is directed towards the first optical resonator. This can be accomplished by directing the second control signal to a transducer that is in contact with or otherwise in communication with the first optical resonator. For example, a second control signal can be provided that modifies the refractive index of the first optical resonator by heating, application of pressure, application of an electrical potential, or a combination of these. In doing so, the first optical resonator becomes coupled, indirectly, to the atomic reference in a fashion that is independent of the output from the source laser.

As noted above, the first optical resonator can be constructed of a material that exhibits optical nonlinearity (for example, cubic nonlinearity). This permits the generation of optical hyperparametric sidebands when the optical resonator is sufficiently optically loaded, via multi-wave mixing. For example, a first optical resonator constructed a material demonstrating cubic nonlinearity (for example, $MgF_2$) can generate optical hyperparametric sidebands based on the output of the source laser when subjected to suitable optical loading from the source laser. Such optical parametric sidebands can be coupled out of the first optical resonator and directed back towards the dichroic mirror. Reflection of the optical hyperparametric sidebands from the dichroic mirror to an optical detector can provide an RF signal that is indirectly locked to atomic or molecular clock transitions, but that does not originate from optical hyperparametric sidebands generated from a source wavelength corresponding to such a clock transition.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive milliner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

What is claimed is:

1. A optical atomic clock, comprising:
an optical resonator comprising an optical material exhibiting optical nonlinearity and configured to produce a plurality of optical hyperparametric sidebands as a result of nonlinear wave mixing;
a first laser, operating at a first wavelength, that is optically coupled to the optical resonator by an optical coupler and that produces laser light that interacts with the optical material of the optical resonator to produce the optical hyperparametric sidebands;
a first locking mechanism that locks the first laser to the optical resonator;
an atomic reference device comprising atoms or molecules that provide an atomic or molecular clock transition;
a second laser, operating at a second wavelength that corresponds to the atomic or molecular clock transition, that is locked to the atomic reference device by a second locking mechanism, wherein the second laser is in optical communication with the optical resonator;
a third locking mechanism that locks the optical resonator to the second laser;
an optical detector that receives light coupled by the optical coupler out of the optical resonator and is configured to convert the optical hyperparametric sidebands into an RF signal that is stabilized by the atomic or molecular transition of the atomic reference device.

2. The optical atomic clock of claim 1, wherein the optical resonator is a whispering gallery mode resonator.

3. The optical atomic clock of claim 1, wherein the refractive index of the optical resonator changes in response to at least one of the group consisting of electrical potential, temperature, and pressure.

4. The optical atomic clock of claim 1, wherein the atomic reference comprises a vapor cell, and wherein the vapor cell encloses a vapor comprising reference atoms selected from the group consisting of rubidium and cesium.

5. The optical atomic clock of claim 1, wherein the atomic reference comprises a trap selected from the group consisting of an atom trap, an ion trap, and a doped solid state matrix serving as a solid state atom trap, and wherein the trap comprises reference atoms or ions.

6. The optical atomic clock of claim 1, wherein the second locking mechanism comprises a Pound-Driver-Hall circuit.

7. The optical atomic clock of claim 1, wherein the first laser operates at a higher output power than the second laser.

8. The optical atomic clock of claim 1, wherein the first laser operates at a longer wavelength than the second laser.

9. The optical atomic clock of claim 1, wherein the second laser operates at a shorter wavelength that the second laser.

10. The optical atomic clock of claim 1, wherein the optical resonator has at least two resonator modes.

11. A method of providing an RF frequency suitable for atomic timekeeping, comprising:
providing a first laser operating at a first wavelength, wherein the first laser is optically coupled to an optical resonator comprised of an optical material that exhibits optical nonlinearity such that a plurality of optical hyperparametric sidebands are produced by the optical resonator, and
wherein the first laser is locked to the optical resonator;
providing a second laser, operating at a second wavelength, that is in optical communication with the optical resonator and that is locked to an atomic reference, wherein the atomic reference comprises atoms or molecules that provide an atomic or molecular clock transition, and wherein the second wavelength corresponds to the atomic or molecular clock transition;
locking the optical resonator to the second laser;
coupling the optical hyperparametric sidebands out of the optical resonator and directing the optical hyperparametric sidebands to an optical detector, wherein the optical detector is configured to convert the optical hyperparametric sidebands into an RF signal that is stabilized by the atomic or molecular clock transition of the atomic reference.

12. The method of claim 11, wherein the optical resonator is a whispering gallery mode resonator.

13. The method of claim 11, wherein the refractive index of the optical resonator changes in response to at least one of the group consisting of electrical potential, temperature, and pressure.

14. The method of claim 11, wherein the atomic reference comprises a vapor cell, and wherein the vapor cell encloses a vapor comprising atoms selected from the group consisting of rubidium and cesium.

15. The method clock of claim 11, wherein the atomic reference comprises a trap selected from the group consisting of an atom trap, an ion trap, and a doped solid state matrix serving as a solid state atom trap, and wherein the trap comprises reference atoms or ions.

16. The method of claim 11, wherein the second laser is locked to the atomic reference using a locking mechanism that comprises a Pound-Driver-Hall circuit.

17. The method of claim 11, wherein the first laser operates at a higher output power than the second laser.

18. The method of claim 11, wherein the first laser operates at a longer wavelength than the second laser.

19. The method of claim 11, wherein the second laser operates at a shorter wavelength that the second laser.

20. The method of claim 11, wherein the optical resonator has at least two resonator modes.

* * * * *